Nov. 1, 1938. W. G. DOYLE 2,134,780
FLUID PRESSURE DEVICE
Filed April 16, 1934 3 Sheets-Sheet 3

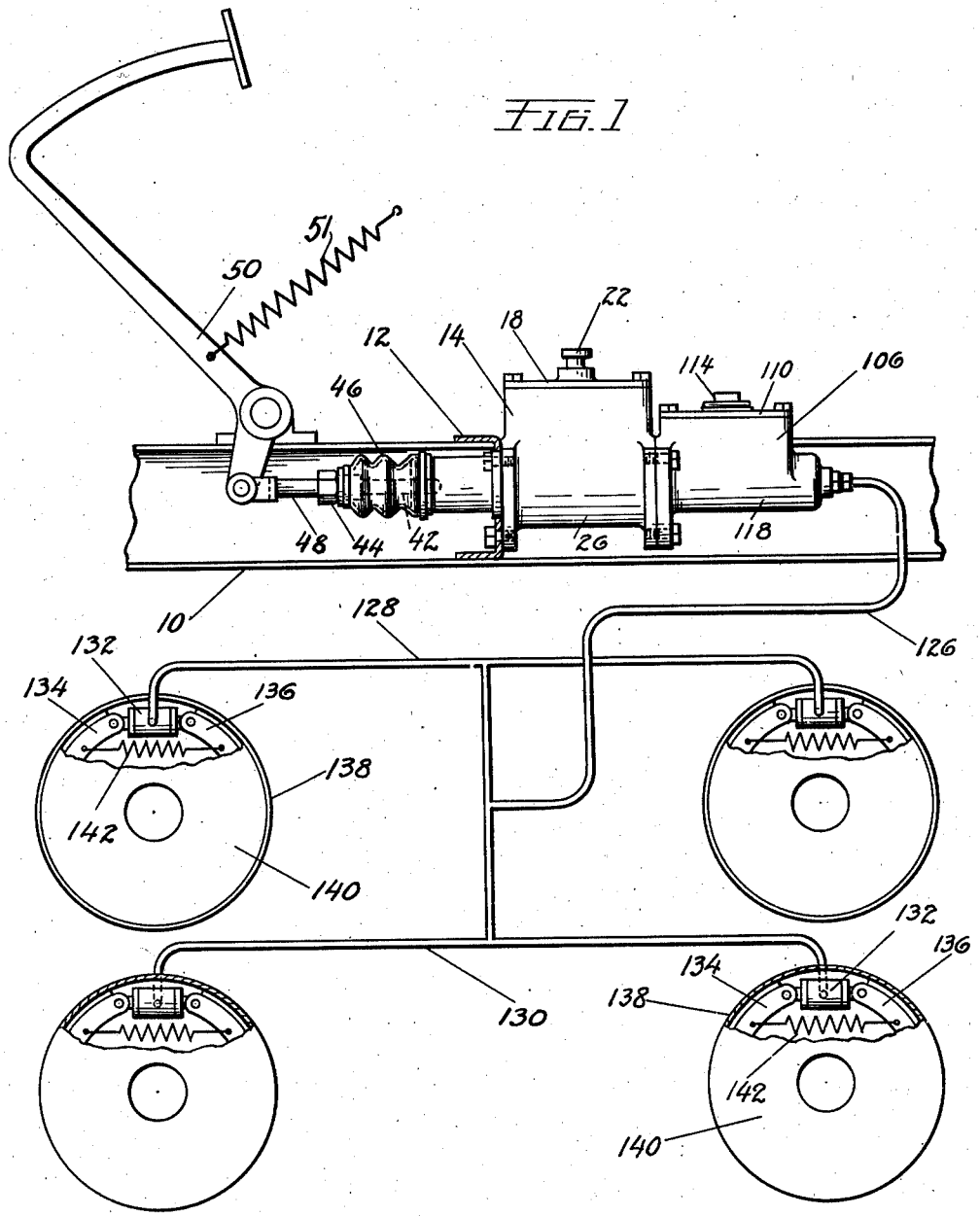

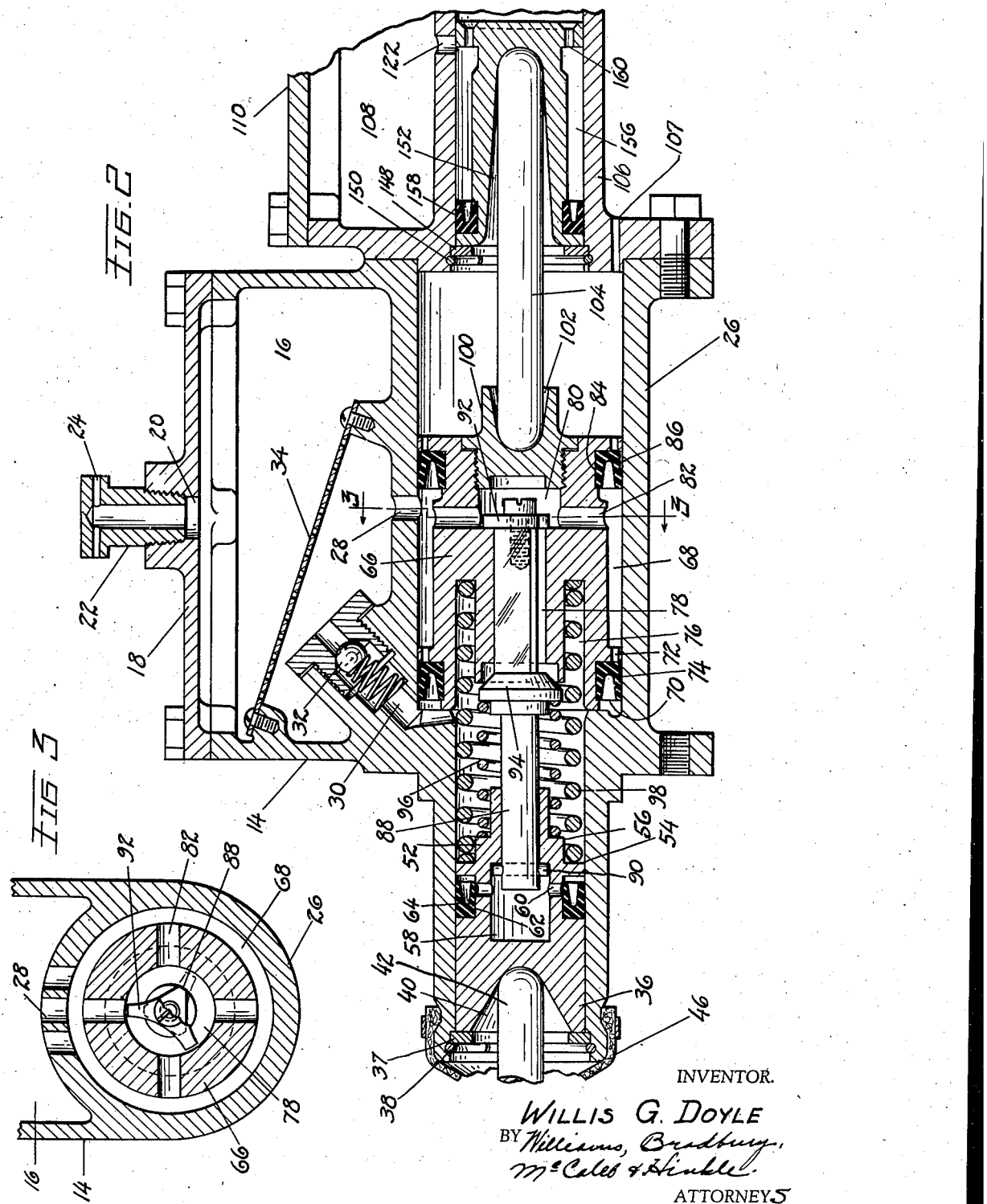

INVENTOR.
WILLIS G. DOYLE
BY Williams, Bradbury,
McCaleb & Hinkle.
ATTORNEYS

Patented Nov. 1, 1938

2,134,780

UNITED STATES PATENT OFFICE 2,134,780

FLUID PRESSURE DEVICE

Willis G. Doyle, Detroit, Mich., assignor to Hydraulic Brake Company, Detroit, Mich., a corporation of California Application April 16, 1934, Serial No. 720,686

10 Claims. (Cl. 188—152)

This invention relates to fluid pressure devices for actuating brakes.

In one embodiment of the invention the device is shown coupled to the compression element of a hydraulic brake system, and in another embodiment of the invention the device is shown coupled to means for actuating a mechanical brake system.

The device includes a reservoir which under normal conditions is substantially full of fluid and a double diametral cylinder supplied with fluid from the reservoir. The cylinder has therein two pistons yieldingly coupled together so that upon the initial movement of the compression stroke the pistons move at the same rate of travel until a predetermined pressure is reached, whereupon the rate of travel of one of the pistons decreases. During the initial movement fluid is drawn from the reservoir into the cylinder between the pistons, and when the predetermined pressure is reached a valve controlling the flow of fluid from the reservoir to the cylinder closes, and thereafter the rate of travel of one of the pistons varies directly as the area of the other piston. This results in gradually stepping up the pressure in increments spread over a relatively wide range.

An object of the invention is to provide a fluid pressure device including means for gradually building up pressure.

Another object of the invention is to provide a fluid pressure device including means for stepping up pressure in increments spread over a relatively wide range.

A feature of the invention is a fluid pressure device having two pistons yieldingly connected and operable to vary the pressure.

Another feature of the invention is a fluid pressure device including a double diametral cylinder having therein pistons of different diameters yieldingly connected so that they may move at different rates of travel to vary pressure.

Other objects and features of the invention will appear from the following description taken in connection with the accompanying drawings which form a part of this specification, and in which—

Figure 1 is a diagrammatical illustration of a motor vehicle brake system including a fluid pressure device embodying the invention;

Figure 2 is a longitudinal sectional view of the fluid pressure device;

Figure 3 is a cross-sectional view substantially on line 3—3, Figure 2.

Figure 4:
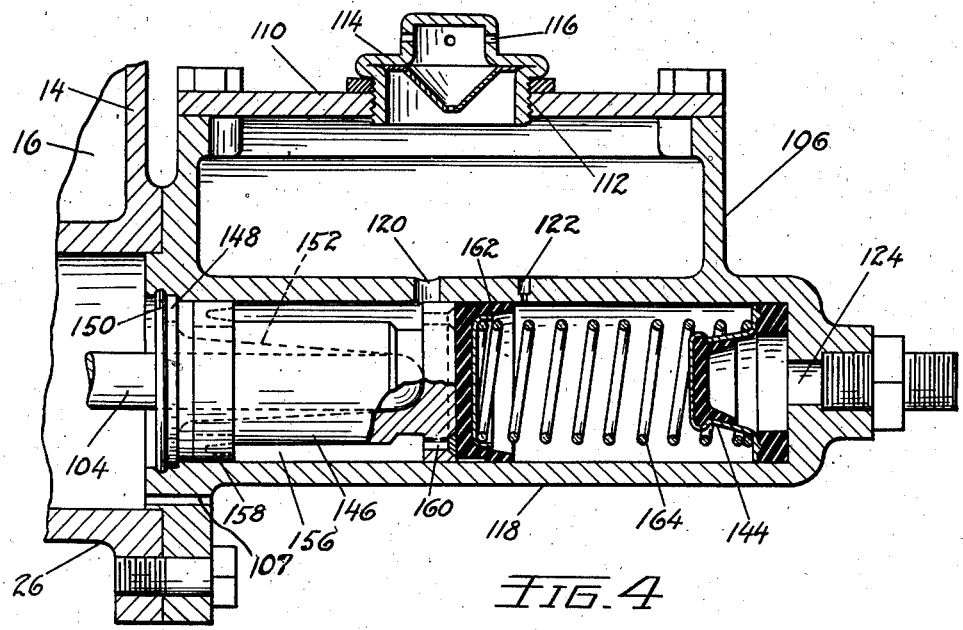
Figure 4 is a longitudinal sectional view of a conventional fluid pressure device.

Referring to the drawings for more specific details of the invention, 10 represents a side rail of a motor vehicle chassis supporting a cross member 12 having secured thereto a housing or casing 14 including an open top reservoir 16. Bolted or otherwise secured to the top of the reservoir is a cover plate 18 having a filling opening 20 in which is secured a closure plug 22 provided with a vent 24.

A double diametral cylinder 26 is formed in the bottom of the reservoir. This cylinder has a port 28 providing communication between the cylinder and the reservoir, and a port 30 also providing a communication between the cylinder and the reservoir, the port 30 being controlled by a check valve 32, and secured in the reservoir above the ports 28 and 30 is a baffle plate 34 arranged to oppose agitation of the fluid in the reservoir and particularly in the vicinity of the valves.

Fitted in the smaller chamber of the cylinder 26 is a reciprocatory piston 36 normally seated on a washer 37 secured in position by a ring 38 seated in a circumferential groove in the wall of the cylinder. Formed in the back of the piston 36 is a recess 40 having seated therein one end of a push rod 42, the other end of which has thereon a coupling 44 connected by a boot 46 to the cylinder for the exclusion of dust and other extraneous substances from the cylinder, and the coupling receives one end of a rod 48 the other end of which is pivotally connected to an operating lever 50, preferably of the foot pedal lever type.

The head of the piston 36 has thereon a concentric sleeve 52 and annular shoulders 54 and 56. The sleeve communicates with a chamber 58 in the body of the piston. This chamber has a plurality of ports 60 providing communications between the chamber and a circumferential groove 62 in the piston, and a leak-proof cup 64 is fitted in the groove.

The larger chamber of the cylinder 26 has therein a reciprocatory piston 66. The body of this piston is reduced in cross-section to provide a chamber 68 between the piston and the wall of the cylinder. The head of the piston has a circumferential groove 70 and a plurality of ports 72 providing communications between the chamber 68 and the groove 70, and fitted in the groove is a collapsible leak-proof cup 74. An annular recess 76 is formed in the head of the piston concentrically to an axial passage 78 having one or more grooves. This passage communicates with a chamber 80 in the back of the piston, and the chamber 80 has a plurality of ports 82 providing communication between the chamber 80 and the chamber 68, and formed in the wall of the chamber 80 is a circumferential groove 84 having fitted therein a leak-proof cup 86.

The pistons 36 and 66 are connected by a rod 88 extending through the sleeve 52 and the passage 78. The rod is held against displacement by a diametral pin 90 in one end thereof and by a spider 92 secured to its other end. The rod carries a valve 94 for control of the passage 78, and a spring 96 interposed between the valve and the shoulder 56 urges the valve to its seat to close the passage 78.

A spring 98 of predetermined load has one end seated on the shoulder 54 and its other end seated in the annular recess 76. This spring tends to force the pistons 36 and 66 apart, and normally retains the valve 94 in open position. The chamber 80 has threaded therein a plug 100 provided with a recess 102 which receives one end of a connecting rod 104, the other end of which may be suitably connected to either the compression element of a hydraulic brake system or to a mechanical brake system.

A housing 106 is suitably secured to the housing 14 and provides a vent 107 for the right-hand end of the cylinder 26. The housing 14 includes an open top reservoir 108 having a cover plate 110 provided with a filling opening 112 in which is secured a plug 114 having a vent 116. A cylinder 118 formed in the bottom of the reservoir 108 has ports 120 and 122 providing communications between the cylinder and the reservoir. This cylinder is arranged in axial alignment with the cylinder 26, and is provided with a port 124 communicating with a fluid pressure delivery pipe or conduit 126, which in turn communicates with branch pressure delivery pipes or conduits 128 and 130 communicating with motor cylinders 132 connected between the separable ends of friction elements 134 and 136 for spreading these elements into engagement with the drums 138 of brakes 140, and the friction elements of the respective brakes are connected by retractor springs 142.

The cylinder 118 has therein a valve 144 for control of the port 124 and a reciprocatory piston 146 retained in the cylinder by a washer 148 secured against displacement by a ring 150 seated in a circumferential groove in the wall of the cylinder. The piston has a recess 152 in its back for the reception of the rod 104 and the body of the piston is reduced in cross-section so as to provide a chamber 156 back of the head of the piston, and fitted on the reduced portion at the base of the piston is a leak-proof cup 158. The head of the piston has a plurality of openings 160 controlled by a collapsible leak-proof cup 162 positioned on the head of the piston and held against displacement by a spring 164 interposed between the valve 144 and the cup 162.

Assuming that the apparatus is filled with fluid, upon depressing the foot pedal lever 50, force is applied through the rods 42 and 48 to move the piston 36 on its compression stroke. During the initial movement of the piston 36 on its compression stroke, the piston 66 is moved, due to the tension of spring 98, at the same rate of travel until a predetermined pressure is attained. During this movement fluid is drawn from the reservoir 16 through the ports 28 and 30 into the cylinder between the pistons. A portion of the fluid entering the cylinder through the port 28 passes through the chamber 68, the ports 72, and past the collapsible leak-proof cup 74 into the chamber between the pistons, and the remainder of the fluid entering the cylinder through the port 28 passes through the ports 82 into chamber 80, and from thence through the passage 78 and valve 94 into the chamber between the pistons.

Upon attaining the predetermined pressure, the spring 98 is sufficiently compressed to close the valve 94, and the valve is retained in closed position by the spring 96. Upon closing the valve 94, fluid is trapped between the pistons 36 and 66, and thereafter the rate of travel of the piston 66 varies directly as the area of the piston 36, resulting in gradually stepping up the pressure and in spreading the transition over a relatively wide range.

As the pistons 36 and 66 move on the compression stroke, force is transferred through the rod 104 to the piston 146. As the piston 146 moves on its compression stroke, fluid in the cylinder 118 is displaced through the valve 144, port 124, fluid pressure delivery pipe or conduit 126 and branch fluid pressure delivery pipes or conduits 128 and 130 to the motor cylinders 132, resulting in spreading the frictional elements 134 and 136 into drum engagement.

Upon release of pressure on the foot pedal lever 50, this lever is returned to its normal position by a return spring 51 and upon the return of the foot pedal lever 50 to its normal position the applied force on the piston 36 is released. Upon release of the applied force on the piston 36, the piston 146 is returned to its retracted position by the spring 164, and since the piston 146 is connected by the rod 104 to the piston 66, which is connected to the piston 36, the pistons 36 and 66 are also returned to their retracted positions. As the pistons 36 and 66 return to their retracted position, fluid is returned from cylinder 26 through the valve 94, passage 78, chamber 80, ports 82, and port 28 to the reservoir.

As the piston 146 returns to its retracted position, fluid is returned from the motor cylinders 132 through the pressure delivery pipes or conduits 126, 128 and 130 and the valve 144 to the cylinder 118. Because of the tension of the spring 164 and friction on the column of fluid in the cylinder 118 and fluid pressure delivery pipes 126, 128 and 130, the piston 146 is returned to its seat slightly in advance of the return of fluid from the motor cylinders, resulting in a partial vacuum in the cylinder 118, causing collapse of the leak-proof cup 162 resulting in drawing fluid from the reservoir 108 through the port 120, past the collapsible leak-proof cup 162 into the cylinder 118. When the cylinder has completely returned to its retracted position and its seat on the washer 148, the port 122 is uncovered, and upon further pressure in the cylinder 118 any excess fluid in the cylinder 118 is returned to the reservoir through the port 122.

Figure 5:
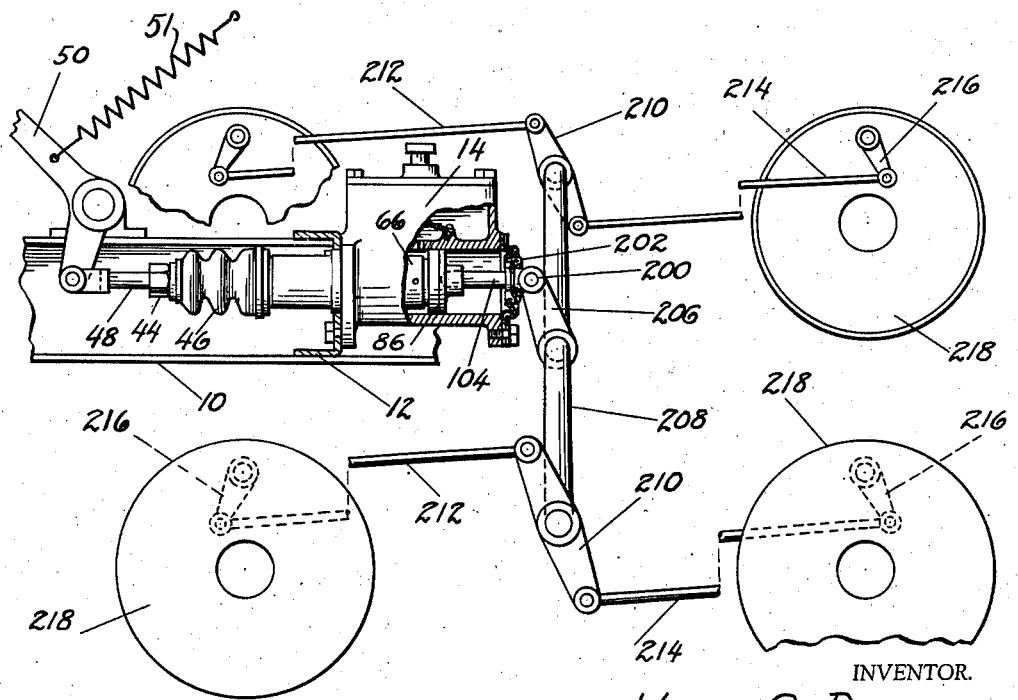
Figure 5 is a diagrammatical illustration of the fluid pressure device connected to a mechanical brake system.

A modified form of the invention is illustrated in Figure 5. In this embodiment of the invention the connecting rod 104 has secured thereto a clevis 200 connected by a flexible boot 202 to the casing 14. The clevis is pivotally connected to a lever 206 secured to a shaft 208 having on its respective ends double end levers 210 connected by rods 212 and 214 to the operative levers 216 of a conventional mechanical brake structure 218.

The operation of this embodiment is substantially the same as in the preferred embodiment of the invention, the only difference being that when force is applied through the connecting rod 104 the lever 206 is moved to rock the shaft 208. This movement of the shaft 208 moves the double end levers 210 and exerts a pull on the rods 212 and 214 to move the operative levers 216 and thereby apply the brakes.

When the applied force is released the levers 216 are returned to inoperative position by retractor springs connected between the friction elements of the brakes 218. This movement of the levers 218 to inoperative position is transmitted to the levers 210, resulting in rocking the shaft in reverse direction and moving the lever 206 through an angle, which movement is transmitted through the rod 104 to the piston 66, and since this piston is connected to the piston 36, the pistons 36 and 66 are returned to their retracted positions.

While preferred embodiments of the invention have been described, it is to be understood that these are given merely as examples of underlying principles of the invention, and since these may be incorporated in other specific structures I do not intend to be limited to those shown except as such limitations are clearly imposed by the appended claims.

Having thus described the various features of the invention, what I claim as new and desire to secure by Letters Patent is:

1. A fluid compression device comprising a reservoir, a pair of cylinders of different diameters, a piston in each of the cylinders, means for spacing the pistons apart yieldable at a predetermined pressure, means for circulating fluid from the reservoir to the space between the pistons including a valve for checking the flow of fluid, means including a second valve for circulating fluid from the reservoir through one of the pistons to the space between the pistons, one of said valves operable at a predetermined pressure to check the flow of the fluid through the piston, and means for applying force to the pistons.

2. A fluid compression device comprising a fluid reservoir, a pair of cylinders of different diameters supplied therefrom, a piston in each of the cylinders, a rod loosely connecting the pistons, a spring-pressed valve on the rod for control of a passage through one of the pistons, a compression spring interposed between the pistons, a valve for control of a passage between the reservoir and the space between the pistons, an actuator for the pistons, a brake system, and linkage connecting the brake system to the pistons.

3. A fluid compression device comprising a fluid reservoir, a pair of cylinders of different diameters supplied therefrom, a piston movable in each of the cylinders, a rod connecting the pistons, said pistons being relatively movable on said rod, a spring-pressed valve on the rod for control of a passage through one of the pistons, a compression spring interposed between the pistons, a valve for control of a passage providing a communication between the reservoir and the cylinders between the pistons, an actuator for the pistons, a fluid pressure brake system, and linkage connecting the brake system to the pistons.

4. A fluid compression device comprising a pair of pistons of different diameters arranged head to head and in spaced relation, a rod connecting the pistons and providing for relative movement thereof, a spring-pressed valve on the rod for control of a passage through one of the pistons, and a compression spring interposed between the pistons.

5. A fluid compression device comprising a pair of pistons of different diameters arranged head to head and in spaced relation, a rod connecting the pistons and providing for relative movement thereof, a spring-pressed valve on the rod for control of a passage through one of the pistons, a leak-proof cup on the head of one of the pistons, a collapsible leak-proof cup on the head of the other piston controlling a plurality of passages through the head, and a compression spring interposed between the pistons.

6. A fluid compression device comprising a reservoir, a large diameter cylinder having a port providing communication between said large diameter cylinder and said reservoir, a check valve controlling said port, a small diameter cylinder concentric with the large diameter cylinder, a piston movable in each of said cylinders, a valve in the large diameter piston operable to close at a predetermined pressure, and means for actuating the pistons operable to move the pistons at the same rate of travel during the initial movement thereof and thereafter to vary the rate of travel of one of the pistons directly as the ratio of the piston areas.

7. A fluid pressure device comprising a fluid reservoir, a large diameter cylinder having a port providing a communication between the reservoir and the cylinder, a check valve controlling the port, a small diameter cylinder concentric with the large diameter cylinder, there being a second port connecting said large diameter cylinder with said reservoir, a piston in each of the cylinders, the pistons being relatively movable, means for moving one of the pistons, means interposed between the pistons and adapted to impart simultaneous positive movement to the other piston during the initial movement of the piston, and therefore to vary the movement of one of the pistons directly as the ratio of areas of the pistons.

8. In a hydraulic brake system of the class described, the combination of a reservoir, a pair of cylinders of different diameters supplied from said reservoir, a piston in each of the cylinders, means for supporting the pistons in spaced relationship between limits and yieldable in one direction at a pre-determined pressure, means for circulating fluid from the reservoir to the space between the pistons, means operable at a pre-determined pressure for trapping the fluid between the pistons, means for applying force to the pistons, a third cylinder, a third piston in said third cylinder, means connecting said third piston with the piston of larger diameter, braking mechanism operated by said third piston, and a spring in said third cylinder for returning all pistons to their retracted positions.

9. In a brake system of the class described, the combination of a reservoir, a pair of cylinders of different diameters supplied from said reservoir, a piston in each of the cylinders, means for supporting the pistons in spaced relationship between limits throughout their movement and yieldable at a pre-determined pressure, means for circulating fluid from the reservoir to the space between the pistons, means operable at a pre-determined pressure for trapping the fluid between the pistons, means for applying force to the pistons, braking mechanism connected to the larger piston and operated thereby, and spring means for returning said mechanism and pistons to rest position.

10. In a brake system of the class described, the combination of a reservoir, a pair of cylinders of different diameters supplied from said reservoir, a piston in each of the cylinders, means for circulating fluid from the reservoir to the space between the pistons, means for supporting the pistons in spaced relationship between limits throughout their movement and operable at a predetermined pressure for trapping the fluid between the pistons, means for applying force to the pistons, braking mechanism operated by said pistons, and resilient means for returning said mechanism and pistons to rest position.

WILLIS G. DOYLE.